(12) United States Patent
Aymonier et al.

(10) Patent No.: US 10,167,374 B2
(45) Date of Patent: Jan. 1, 2019

(54) METHOD FOR RECOVERING ORGANIC FIBERS FROM A COMPOSITE MATERIAL

(71) Applicants: CENTRE NATIONAL DE LA RECHERCHE SCIENTIFIQUE (CNRS), Paris (FR); UNIVERSITE DE BORDEAUX, Talence (FR); AIRBUS OPERATIONS (S.A.S.), Toulouse (FR)

(72) Inventors: Cyril Aymonier, Begles (FR); Anne Loppinet Serani, Bordeaux (FR); Antoine Debeauvais, Talmas (FR)

(73) Assignees: UNIVERSITY DE BORDEAUX, Bordeaux (FR); AIRBUS OPERATIONS (S.A.S), Toulouse (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 70 days.

(21) Appl. No.: 14/899,420

(22) PCT Filed: Jun. 19, 2014

(86) PCT No.: PCT/EP2014/062958
§ 371 (c)(1),
(2) Date: Dec. 17, 2015

(87) PCT Pub. No.: WO2014/202730
PCT Pub. Date: Dec. 24, 2012

(65) Prior Publication Data
US 2016/0145409 A1    May 26, 2016

(30) Foreign Application Priority Data
Jun. 20, 2013 (FR) ..................... 13 55869

(51) Int. Cl.
*C08J 11/24* (2006.01)
*B29B 17/02* (2006.01)
(Continued)

(52) U.S. Cl.
CPC .............. *C08J 11/24* (2013.01); *B29B 17/02* (2013.01); *C08J 11/14* (2013.01);
(Continued)

(58) Field of Classification Search
CPC ........ C08J 11/14; C08J 11/24; C08J 2300/22; C08J 2301/02; C08J 2377/00;
(Continued)

(56) References Cited

U.S. PATENT DOCUMENTS 4,003,880 A * 1/1977 Sidebotham ............. C08J 11/08
264/344
2004/0102533 A1* 5/2004 Durand ................... C08J 11/24
521/40

FOREIGN PATENT DOCUMENTS

CN 101899723 A 12/2010
CN 102144056 A 8/2011
(Continued)

OTHER PUBLICATIONS

French Search Report, dated Mar. 12, 2014, French Application No. 1355869.
(Continued)

*Primary Examiner* — Frances Tischler
(74) *Attorney, Agent, or Firm* — Womble Bond Dickinson (US) LLP

(57) ABSTRACT

The invention relates to a method for recovering organic fibers from a composite material comprising a polymer matrix and organic fibers, wherein the method comprises the following steps: providing a solution comprising a mixture of water and alcohol; placing the composite material inside
(Continued)

a reactor; contacting the mixture and the composite material in order to perform a solvolysis reaction of the composite material; and recovering the organic fibers; wherein the pressure and the temperature in the reactor are adjusted such as to fall within the homogeneous sub-critical range of the phase diagram, within the super-critical range or near the critical point; and wherein the temperature is lower than the melting temperature of the organic fibers.

21 Claims, 2 Drawing Sheets

(51) Int. Cl.
*C08J 11/14* (2006.01)
*B29K 105/06* (2006.01)

(52) U.S. Cl.
CPC ... *B29B 2017/0293* (2013.01); *B29K 2105/06* (2013.01); *C08J 2300/22* (2013.01); *C08J 2301/02* (2013.01); *C08J 2377/00* (2013.01); *Y02W 30/622* (2015.05); *Y02W 30/704* (2015.05); *Y02W 30/706* (2015.05)

(58) Field of Classification Search
CPC .......... B29B 17/02; B29B 2017/0293; Y02W 30/622; Y02W 30/704; Y02W 30/706; B29K 2105/06
USPC .................................. 521/40–49.8
See application file for complete search history.

(56) References Cited

FOREIGN PATENT DOCUMENTS

DE 102011081575 2/2013
EP 1419830 5/2004

OTHER PUBLICATIONS

International Search Report with English Language Translation, dated Jul. 16, 2014, Application No. PCT/EP2014/062958.
Morales Ibarra, R., et al., "Water and Benzyl Alcohol in Subcritical and Supercritical Conditions as means for Carbon Fiber Recovery from Thermoset Composite Materials", *Journal of Advanced Research in Physics*, Abstract, (May 16, 2012).
Okajima, Idzumi, et al., "Chemical Recycling of Carbon Fiber Reinforced Plastic with Supercritical Alcohol", *Journal of Advanced Research in Physics*, Retrieved from the Internet: http://dosser-services.internal.epo.org/application/EPO-internal/EP/11002460/?serveAsMime=application/pdf,overlay=true&inline=true&booklet=false&language=en&clientid=diplus#view=FitH&toolbar=0&navpanes=0, (Dec. 31, 2012), pp. 21211-1.
Pinero-Hernanz, Raul, et al., "Chemical recycling of carbon fibre reinforced composites in nearcritical and supercritical water", *Composites Part A: Applied Science and Manufacturing*, vol. 39, No. 3, (Jan. 11, 2008), pp. 454-461.
Written Opinion received for PCT Patent Application No. PCT/EP2014/062958, dated Jul. 16, 2014, 10 pages (5 pages of English Translation and 5 pages of Original Document).
International Preliminary Report on Patentability received for PCT Patent Application No. PCT/EP2014/062958, dated Dec. 30, 2015, 13 pages (7 pages of English Translation and 6 pages of Original Document).

* cited by examiner

METHOD FOR RECOVERING ORGANIC FIBERS FROM A COMPOSITE MATERIAL

FIELD OF THE INVENTION

The present invention relates to the field of the recycling, recovery and reuse of waste and/or end-of-life composite materials, and in particular to the recovery of organic fibers from organic-fiber/polymer-matrix composite materials. In particular, it relates the field of methods for recovering organic fibers from organic-fiber/polymer-matrix composite materials.

PRIOR ART

A composite material is an assembly of at least two immiscible (but highly adhesive) materials. Thus, the composite material has properties that each of the two materials does not.

A composite material typically comprises a structural material, also called reinforcing material or reinforcement, and a matrix.

The reinforcement generally provides the material with mechanical strength. The reinforcement can be made of metal, glass, carbon, ceramic, mineral (such as clay, talc) or a polymer or organic material, and can have several forms, such as fibers (short: 0.1 to 1 mm; semi-long: 1 to 100 mm; continuous: greater than 100 mm), or loads of various forms (whiskers, beads, platelets, etc.). Continuous fibers can be disposed, in one or more layers, parallel to each other (unidirectional reinforcement); at a predefined angle, for example at 45° to each other (multidirectional reinforcement); or randomly. In the case of a plurality of layers, two layers can have orientations different from those presented above. The reinforcement can be alone within the matrix or combined with another reinforcement of different nature.

The matrix ensures the cohesion of the structure and the transfer of stresses to the reinforcement. There are composite materials having a metal matrix, a ceramic matrix or a polymer matrix. The latter can be divided into thermoset matrices and thermoplastic matrices. The following relates to composite materials having a polymer matrix, also called organic-matrix composites.

These composite materials are used in various applications. However, the waste from these composite materials is difficult to recycle. Indeed, due to the highly adhesive nature of the reinforcement and the matrix, these composite materials are difficult to separate without destroying one or the other.

At end-of-life these composite materials are generally buried in landfills. The cost of storage is high and constantly increasing. Furthermore, storage allows no particular reuse of these materials and its sustainability is not guaranteed.

There is another solution for these composite materials: incineration. Indeed, polymer-matrix composite materials have an energy value that depends on the nature of the polymer matrix and the fiber level in the composite material. Incinerating these makes it possible to extract their value as energy, but without the opportunity to extract their value as material, given that the fiber part has high added value. In the case of a polymer-matrix composite material with an organic reinforcement, the totality of the composite material can be converted to energy by incineration. However, in recent years, the emphasis has been on environmental considerations. For example, Directive 2000/53/EC on end-of-life vehicles stipulates that from Jan. 1, 2006 and until Jan. 1, 2015, the rate of reuse and recovery of the component materials of said end-of-life vehicles will have to increase from 85% to 95%, with the rate of reuse and recycling increasing from 80% to 85%. In another example, Directive 2004/01/EC stipulates that environmental aspects are to be taken into account in the individual and consolidated accounts of businesses.

Neither burying in landfills nor incineration can be a satisfactory solution.

This is why other solutions have been developed for recovering these composite materials. For example, pyrolysis in a molten salt bath is an intermediate solution between energy recovery and material recovery. This method consists in depolymerizing the polymer parts of the composite material at a temperature of 500° C. in order to obtain petrochemical products. However, for polymer-matrix composite materials reinforced with organic reinforcement, the cost of this method is very high (10 times the cost of incineration). Consequently, this method is less advantageous than incineration.

Another solution is thermolysis, more particularly pyrolysis. This method consists in thermal degradation (at a temperature between about 450° C. and about 700° C.), in the virtual absence of oxygen, of the organic part of a polymer-matrix composite material comprising carbon fibers or glass fibers. Thermolysis makes it possible to recover both the polymer matrix and the inorganic fibers of composite materials. However, during thermolysis, the composite materials are subjected to a temperature that is too high to allow the recovery of organic reinforcing fibers. Furthermore, this method produces secondary residues, such as solid particles and gases, which must then be treated.

Much research is directed toward the solvolysis of composite materials, in particular composite materials comprising a polymer matrix and a reinforcement consisting of carbon fibers or glass fibers. Indeed, the maximum acceptable temperature of these fibers permits the use of relatively high temperatures for decomposition of the matrix (up to 500° C.). The solvent used is generally pure and can be water, organic solvents such as alcohols (for example ethanol and methanol), or acetone, in the presence or absence of catalyst.

Liu Yuyan et al. ("The Experimental Research on Recycling of Aramid Fibers by Solvent Method," in J. Reinforced Plastics and Composites, Vol. 28, No. 18/2009) propose a method for recycling composite materials comprising an epoxy matrix and aramid fibers as reinforcement by dissolution of the matrix in solvent. In this method, a composite material is cut into pieces and then plunged into a 1,2,3,4-tetrahydronaphthalene bath, and heated at various temperatures for various lengths of time. The authors tested temperatures of 280, 290, 300, 310 and 320° C. with a polymer matrix/solvent ratio of 1 g/10 ml for 1 hour. This study concluded with the feasibility of recycling the aramid fibers contained in composite materials having an organic matrix of epoxy resin.

However, this method uses 1,2,3,4-tetrahydronaphthalene as the solvent, a solvent having a very negative impact on the environment, and involves cutting the composite into small pieces so that the solvent can reach the entire surface of the resin, which prevents recovery of the fiber for subsequent reuse.

Presentation

An objective is thus to overcome at least one disadvantage of the prior art presented above.

To this end, a method for recovering organic fibers from a composite material comprising a polymer matrix and organic fibers is proposed. This method comprises the following steps:
  providing a solution comprising a mixture of water and alcohol;
  disposing the composite material inside a reactor;
  placing the mixture in contact with the composite material in order to carry out a solvolysis reaction of the polymer matrix of the composite material;
  recovering the organic fibers;
  wherein the pressure and temperature in the reactor are adjusted so as to fall within the homogeneous subcritical region of the phase diagram, within the supercritical region, or near the critical point; and
  wherein the temperature is below the degradation temperature of the organic fibers.

Thanks to this method, the organic fibers of composite materials comprising a polymer matrix and organic reinforcing fibers can be recovered without the use of a solvent having a very negative impact on the environment.

The other required features are:
  the temperature and/or the pressure is supercritical;
  the organic fibers are aramid fibers and the temperature is set to at most 300° C.;
  the aramid fibers are selected from: meta-aramid fibers, para-aramid fibers, para-aramid and meta-aramid copolymer fibers, or a mixture thereof;
  the organic fibers are plant fibers;
  the plant fibers are selected from the group consisting of: flax fibers, banana fibers, hemp fibers, nettle fibers, coconut fibers, cotton fibers, henequen fibers, sisal fibers, jute fibers, ramie fibers, fibers from wheat straw or any other grain, wood fibers, or a mixture thereof;
  the polymer matrix is thermoset polymer or thermoplastic polymer;
  the mixture of water and alcohol has a water/alcohol volume ratio between 30:70 and 70:30;
  the mixture and the composite material are placed in contact for 15 to 105 minutes;
  the mixture and the composite material are placed in contact by circulating a stream of the mixture through the reactor inside which the composite material is disposed;
  the method further comprises the step consisting in reducing the composite material to granules before being placed in contact with the mixture;
  the method further comprises the recovery of effluent produced by the solvolysis and discharged outside the reactor; and
  optionally the combustion of the effluent to heat the reactor.

DRAWINGS

Other objectives, features and advantages will become apparent upon reading the following description, in reference to the drawings, provided as illustration on a non-limiting basis.

DESCRIPTION

Figure 1:
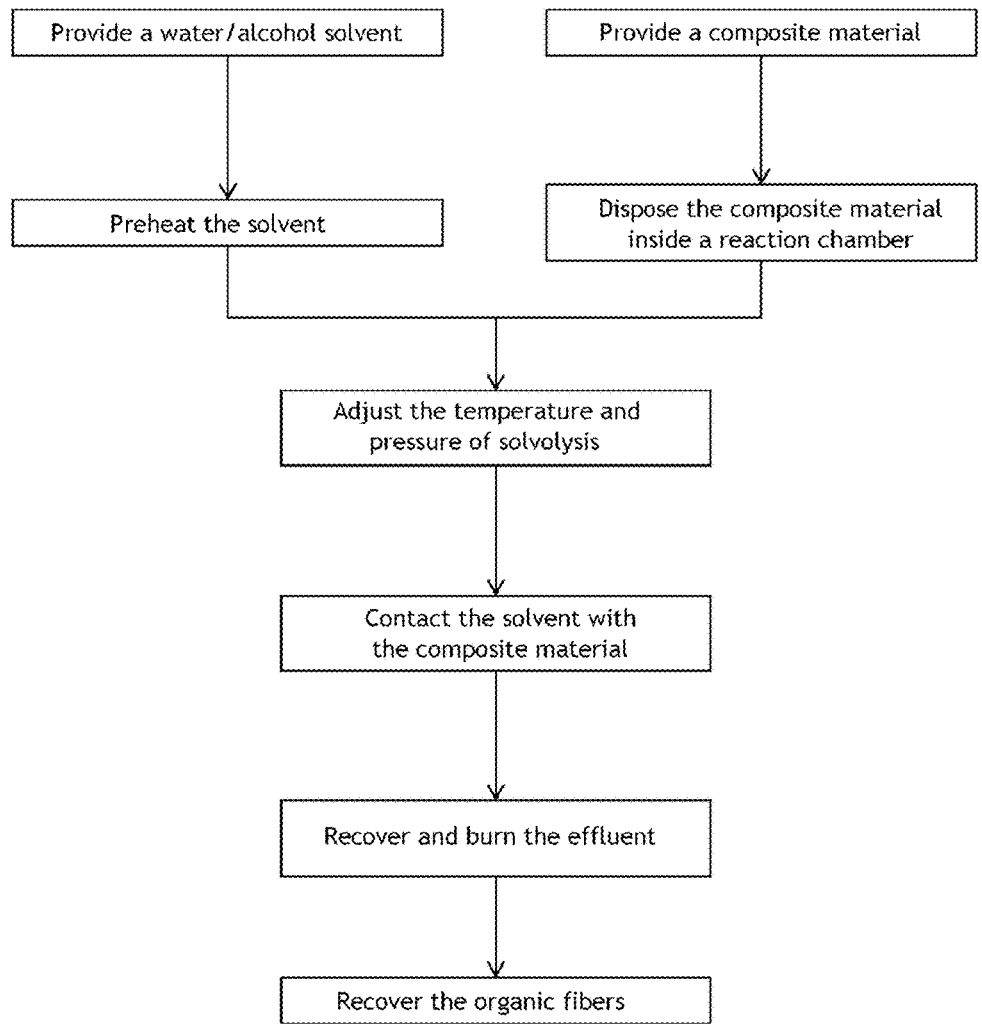
FIG. 1 is a diagram showing the various steps of the organic fiber recovery method.

A method for recovering organic fibers from a composite material comprising a polymer matrix and organic fibers is disclosed below in reference to FIG. 1.

The term "composite material" means herein an assembly of at least two immiscible (but highly adhesive) materials. The new material thus constructed has properties that the individual elements do not. A composite material comprises a matrix and a reinforcement.

The term "fiber" means herein a plant, animal, mineral or artificial elemental form having a length of up to several hundred times its diameter, and generally in the form of bundles. The organic fiber can be present in the composite material in the form of individual fibers or a woven fiber fabric.

A plant elemental form is a flexible filament, called plant fiber, a constituent of plant tissue, in particular the wood, stems or roots of certain plants. Examples of plant fibers include banana (genus *Musa*), and in particular abaca (*Musa textilis*, also called Manila hemp), hemp (*Cannabis sativa*, for example in the form of shives), nettle (genus *Urtica*), coconut (*Cocos nucifera*), cotton (genus *Gossypium*), henequen (*Agave fourcroydes*), sisal (*Agave sisalana*), jute (genus *Corchorus*), flax (*Linum usitatissimum*, for example in the form of shives), ramie (*Bohemeria nivea*), fibers from wheat straw or any other grain, wood fibers, or a mixture thereof.

An artificial elemental form generally involves aramid fibers. Aramid (portmanteau of "aromatic polyamide") is a long-chain polymer wherein at least 85% of the aramid linkages (—NH—CO—) are attached directly to two benzene rings.

Generally, aramid is obtained by polycondensation of an aromatic diamine ($NH_2$—$Ar^1$—$NH_2$) and an aromatic acid dichloride (ClCO—$Ar^2$—COCl) in an organic solvent:

$$nNH_2-Ar^1-NH_2 + nClCO-Ar^2-COCl \rightarrow -(NH-Ar^1-NH-CO-Ar^2-CO)_n- + 2nHCl$$

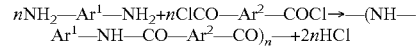

$Ar^1$ and $Ar^2$ each representing an aromatic ring and —(NH—$Ar^1$—NH—CO—$Ar^2$—CO)$_n$— is the aramid resulting from polycondensation.

Several commercial types of aramid fibers exist, differentiated by the position of the functional groups on the aromatic rings:
  para-aramids, for example poly(p-phenyleneterephthalamide);
  meta-aramids, for example poly(m-phenyleneisophthalamide); and
  para-aramid copolymers.

Para-aramid fibers are highly oriented during the spinning process. Consequently, they are characterized by high tensile strength (about 3 GPa) and low density (about 1.45 g·cm$^{-3}$). They are used, for example, to manufacture body armor; reinforcements in elastomers (tires, pipes), ropes and cables; reinforcements for fiber optic bundles; and reinforcements for composite materials. More particularly, in their short form, para-aramid fibers are used for the manufacture of gloves, protective clothing and, more recently, as reinforcements in injectable thermoplastic matrices to give the latter better abrasion resistance. In pulp form, these fibers replaced asbestos fiber in applications where good resistance to heat and abrasion is required, for example, in clutch disks, brake pads and joints.

In 1998, about 9000 t of para-aramid fiber was consumed in Europe.

Para-aramids are chiefly marketed under the names Kevlar™ by DuPont de Nemours, Twaron™ by Akzo and Technora™ by Teijin.

Meta-aramid fibers have lower tensile strength than para-aramid fibers. On the other hand, they are more stable thermically and chemically and are highly valued in applications related to protection, for example the manufacture of clothing and industrial fibers, for their resistance to fire and chemical agents. In paper form they are widely used for electrical insulation and the manufacture of honeycombs for "sandwich" composites.

Meta-aramids are chiefly marketed under the names Nomex™ by DuPont de Nemours and Conex™ by Teijin.

The polymer constituting the polymer matrix is a thermoset polymer or a thermoplastic polymer. Preferably, thermoset polymer is selected from the group consisting of epoxy or phenol resins.

The method uses as solvent a solution comprising a mixture of water and alcohol. The water/alcohol volume ratio of the mixture is preferably 50:50. Preferably, the alcohol is selected from the group consisting of methanol, ethanol, n-propanol, isopropanol, glycerol or a mixture thereof.

The mixture of water and alcohol has a water/alcohol volume ratio advantageously between 30:70 and 70:30, preferably between 40:60 and 60:40, more preferably between 45:55 and 55:45, still more preferably of about 50:50.

The method also comprises the disposition of the composite material inside a reactor. Before disposing the composite material inside the reactor, it can be cut into sections of desired volume, or reduced by granulation according to the size of the reactor.

The method also comprises the placing of the solvent in contact with the composite material in order to carry out a solvolysis reaction of the polymer matrix of the composite material.

The pressure and temperature conditions are adjusted so as to fall within the homogeneous subcritical region of the phase diagram, i.e., above the liquid-vapor transition curve, or within the supercritical region, i.e., above the critical temperature and the critical pressure, or preferably near the critical point, i.e., within 50° C. of the critical temperature and within 50 bar of the critical pressure, still preferably within 25° C. of the critical temperature and within 25 bar of the critical pressure.

The reactor can be heated inside an oven. As a variant or in addition, the reactor can also be heated by combusting the effluent produced during solvolysis of the matrix, i.e., said effluent is recovered in order to be burned.

The solvolysis reaction is preferably carried out under conditions of supercritical temperature and pressure, i.e., above the Tc and Pc of the solvent.

The temperature must be lower than the temperature at which the properties of the organic fibers degrade, in order not to degrade them, for example Young's modulus, yield point, surface appearance of the organic fibers, etc. For example, the temperature is preferentially set to at most 300° C. in the case of aramid fibers, and at most 175° C. for flax fibers.

The placing in contact lasts between about 15 minutes and about 105 minutes, preferably between about 30 minutes and about 90 minutes, more preferably between about 45 minutes and about 75 minutes, still more preferably about 60 minutes.

The placing of the solvent in contact with the composite material is advantageously carried out by circulating a stream of solvent through the reactor in which the composite material is disposed.

For example, upstream of the reactor is envisaged a solvent inlet. The solvent inlet can be coupled to a pump in order to convey the solvent inside the reactor at the selected pressure. The pump is thus capable of generating pressures up to 30 MPa.

The method can also comprise, before the contacting of the mixture, a step of preheating the solvent. To this end, the solvent inlet can also be coupled to a preheater in order to preheat the solvent to the temperature desired at the reactor inlet; preferably the solvent is preheated such that at the reactor inlet it is equal to the solvolysis temperature.

Downstream of the reactor is envisaged an outlet for withdrawing the solvent from which the molecules resulting from the decomposition of the polymer matrix (called effluent) have been extracted by solvolysis. When the decomposition of the polymer matrix is complete, these are the monomers that are recovered from the mixture and that can be reintroduced into the production chain of new polymers.

At the end of the solvolysis, the organic fibers are recovered. The surface quality of these organic fibers is undamaged in comparison with new organic fibers.

This method has applications in the recycling of composite materials comprising a polymer matrix and an organic reinforcing fiber. For example, this method will advantageously be used for recycling tires, conveyer belts, high pressure pipes, drive belts, aircraft components, boats, shielding, cables such as ropes, telecommunications cables, protective clothing such firemen's uniforms, military helmets and safety helmets, bullet-proof vests, cut-resistant clothing and brake pads.

Example 1 (E1)

Several water/ethanol mixtures were prepared and used as solvent. The weight percentages of the resin constituting the extracted polymer matrix are presented in Table 1 below.

TABLE 1

|  | E1-1 | E1-2 | E1-3 | E1-4 | E1-5 |
|---|---|---|---|---|---|
| % water (volume) | 90 | 75 | 50 | 25 | 10 |
| % extracted resin (weight) | 93 | 98.8 | 99.1 | 81.6 | 73.2 |
| Tc (° C.) | 368 | 325 | 315 | 277 | 257 |

A composite material consisting of about 30% by weight polymer matrix (epoxy resin) and aramid fibers are cut into pieces weighing between 1 g and 10 g.

The pieces of composite material are then disposed inside a 110 ml cylindrical reactor.

The solvent is then contacted with the composite material for 60 minutes by means of a solvent inlet disposed upstream of the reactor and coupled to a high-pressure pump. Furthermore, the solvent inlet is coupled to a preheater to raise the inlet's temperature to the solvolysis temperature (300° C.). The reactor is also heated to the solvolysis temperature. The pressure inside the reactor is 250 bar.

GC/MS analysis of the liquid effluent made it possible to identify the products resulting from decomposition of the polymer matrix. The products are: phenol, benzenamine, quinoline, bisphenol, 2-ethylhexan-1-ol, and 1,1-diethoxyethane and derivatives thereof.

These products correspond to the monomers or polymer fragments initially present in the polymer matrix, and/or in the hardeners, and/or adhesives optionally present in the starting composite material. The presence of these products confirms that the polymer matrix was depolymerized. Furthermore, no trace of molecules possibly resulting from the decomposition of aramid fibers was detected, which confirms the selective character of the solvolyses used.

A solvent consisting of a mixture having a water/ethanol volume ratio of 50:50 constitutes a compromise between solvolysis efficiency and aramid fiber surface quality.

Example 2: Flax Fibers

Figure 2:
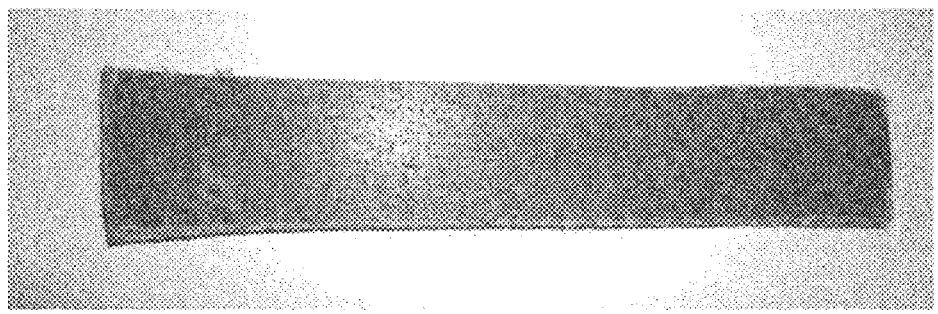
FIG. 2 is a black and white photograph showing a specimen of composite material consisting of a polymer matrix of PLA and woven flax fibers before treatment according to the method described herein.

A composite material consisting of about 40% by volume flax fibers and 60% by volume polymer matrix in polylactic acid was cut into generally rectangular specimens as shown in FIG. 2. In this FIG. 2, the flax fibers can be seen to be embedded in the polymer matrix.

This material is then placed in a reactor and contacted with a solvent consisting of a mixture of water and ethanol in a 50:50 volume ratio and preheated to 175° C. The solvolysis is carried out at 175° C. and 250 bar for 30 minutes. These conditions correspond to the homogeneous subcritical region of the solvent.

Figure 3:
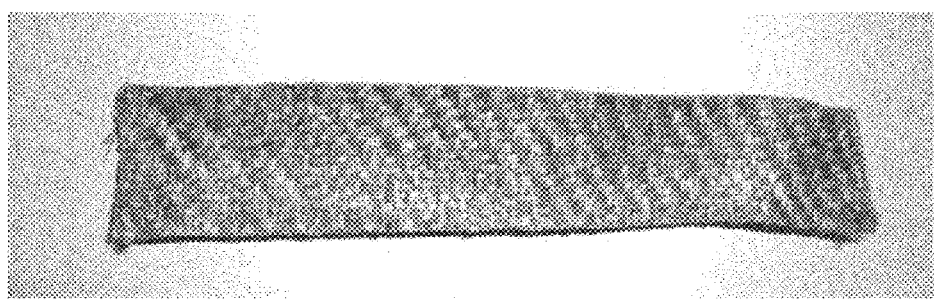
FIG. 3 is a black and white photograph showing a specimen corresponding to the specimen in FIG. 2 but having undergone the treatment according to the method described herein.

FIG. 3 shows what remains of the composite material at the end of the solvolysis. The polymer matrix was completely decomposed and the flax fibers remained intact.

Comparative Example 1 (CE1): Pure Solvents

Comparative examples were prepared using pure solvents: water, ethanol and isopropanol. The method used is the same as for Example 1 above. Table 2 below shows the percentage by mass of extracted polymer matrix according to the solvent used and the solvolysis temperature.

TABLE 2

| Solvolysis temperature | water | ethanol | isopropanol |
| --- | --- | --- | --- |
| 150° C. | 2.4% | 3.1% | 0.3% |
| 250° C. | 27.8% | 7.9% | 6.8% |
| 300° C. | 97.9% | 68.2% | 36.8% |
| 400° C. | 100% | — | — |

The table shows that the solvolysis is ineffective whatever the pure solvent used at a temperature of 150° C. There is an improvement when the temperature is increased, and at 300° C. the percentage of extracted resin reached 97.9% for water, but only 68.2% for ethanol and 36.8% for isopropanol. However, with water as the solvent and a solvolysis temperature of 300° C., the fibers are altered. With this solvent at 400° C., degradation of the organic fiber is total.

The table does not show a value for solvolysis at 400° C. with ethanol or isopropanol because at this temperature isopropanol and ethanol molecules risk being degraded.

The invention claimed is:

1. A method for recovering organic fibers from a composite material comprising a polymer matrix and organic fibers, the method comprising the following steps:
   providing a solution comprising a mixture of water and alcohol;
   disposing the composite material inside a reactor;
   placing the mixture in contact with said composite material in order to carry out a solvolysis reaction of said polymer matrix of said composite material;
   recovering said organic fibers;
   wherein said organic fibers are selected from aramid fibers, plant fibers and any mixture thereof;
   wherein the pressure and temperature in said reactor are adjusted so as to fall within the homogeneous subcritical region of the phase diagram, within the supercritical region, or within 50° C. of the critical temperature and within 50 bar of the critical pressure;
   wherein said temperature is below the degradation temperature of the organic fibers and is set to at most 300° C.; and
   wherein said mixture of water and alcohol has a water/alcohol volume ratio of between 50:50 and 75:25.

2. The method according to claim 1, wherein the temperature and/or pressure is supercritical.

3. The method according to claim 1, wherein said aramid fibers are selected from the group consisting of metaaramid fibers, paraaramid fibers, para-aramid and meta-aramid copolymer fibers, and any mixture thereof.

4. The method according to claim 1, wherein said plant fibers are selected from the group consisting of flax fibers, banana fibers, hemp fibers, nettle fibers, coconut fibers, henequen fibers, sisal fibers, jute fibers, ramie fibers, fibers from wheat straw or any other grain, wood fibers, and any mixture thereof.

5. The method according to claim 1, wherein said polymer matrix is thermoset polymer or thermoplastic polymer.

6. The method according to claim 1, wherein said mixture of water and alcohol has a water/alcohol volume ratio of between 50:50 and 70:30.

7. The method according to claim 1, wherein said mixture and the composite material are placed in contact for 15 to 105 minutes.

8. The method according to claim 1, wherein said mixture and the composite material are placed in contact by circulating a stream of said mixture through the reactor inside which said composite material is disposed.

9. The method according to claim 1, further comprising the step consisting in reducing said composite material to granules before being placed in contact with said mixture.

10. The method according to claim 1, further comprising the recovery of effluent produced by the solvolysis and discharged outside the reactor; and optionally the burning of the effluent to heat the reactor.

11. The method according to claim 1, wherein the pressure and temperature in said reactor are adjusted so as to fall within the homogeneous subcritical region of the phase diagram.

12. The method according to claim 1, wherein said organic fibers are flax fibers.

13. The method according to claim 1, wherein said alcohol is selected from the group consisting of methanol, ethanol, n-propanol, isopropanol, glycerol and any mixture thereof.

14. The method according to claim 1, wherein said plant fibers are cotton fibers.

15. The method according to claim 1, wherein said polymer matrix is depolymerized.

16. The method according to claim 6, wherein said mixture of water and alcohol has a water/alcohol volume ratio of between 50:50 and 60:40.

17. The method according to claim 1, wherein said mixture and said composite material are placed in contact for 45 to 75 minutes.

18. The method according to claim 1, further comprising the recovery of effluent produced by the solvolysis and discharged outside said reactor; and the burning of the effluent to heat said reactor.

19. A method for recovering organic fibers from a composite material consisting of a polymer matrix and organic fibers, the method comprising the following steps:
 providing a solution comprising a mixture of water and alcohol;
 disposing said composite material inside a reactor;
 placing said mixture in contact with said composite material in order to carry out a solvolysis reaction of said polymer matrix of said composite material;
 recovering said organic fibers;
 wherein the organic fibers are selected from aramid fibers or plant fibers;
 wherein the pressure and temperature in said reactor are adjusted so as to fall within the homogeneous subcritical region of the phase diagram, within the supercritical region, or within 50° C. of the critical temperature and within 50 bar of the critical pressure;
 wherein the temperature is below the degradation temperature of the organic fibers and is set to at most 300° C.; and
 wherein said mixture of water and alcohol has a water/alcohol volume ratio of between 50:50 and 75:25.

20. A method for recovering organic fibers from a composite material consisting of a polymer matrix, organic fibers and filler, the method comprising the following steps:
 providing a solution comprising a mixture of water and alcohol;
 disposing said composite material inside a reactor;
 placing said mixture in contact with said composite material in order to carry out a solvolysis reaction of said polymer matrix of said composite material;
 recovering said organic fibers;
 wherein the organic fibers are selected from aramid fibers or plant fibers;
 wherein the pressure and temperature in the reactor are adjusted so as to fall within the homogeneous subcritical region of the phase diagram, within the supercritical region, or within 50° C. of the critical temperature and within 50 bar of the critical pressure;
 wherein the temperature is below the degradation temperature of the organic fibers and is set to at most 300° C.; and
 wherein said mixture of water and alcohol has a water/alcohol volume ratio of between 50:50 and 75:25.

21. A method for recovering organic fibers from a composite material comprising a polymer matrix and organic fibers, the method comprising the following steps:
 providing a solution comprising a mixture of water and alcohol;
 disposing the composite material inside a reactor;
 placing the mixture in contact with said composite material in order to carry out a solvolysis reaction of said polymer matrix of said composite material;
 recovering said organic fibers;
 wherein said organic fibers are selected from aramid fibers, plant fibers and any mixture thereof;
 wherein the pressure and temperature in said reactor are adjusted so as to fall within the homogeneous subcritical region of the phase diagram, within the supercritical region, or within 50° C. of the critical temperature and within 50 bar of the critical pressure;
 wherein said temperature is below the degradation temperature of the organic fibers and is set to at most 300° C.;
 wherein said alcohol is selected from the group consisting of methanol, ethanol, n-propanol, isopropanol, glycerol or a mixture thereof; and
 wherein said mixture of water and alcohol has a water/alcohol volume ratio of between 50:50 and 75:25.

* * * * *